(12) United States Patent
Babej (10) Patent No.: US 8,622,672 B2
(45) Date of Patent: Jan. 7, 2014

(54) PRESS-IN ELEMENT, COMPONENT ASSEMBLY CONSISTING OF A PRESS-IN ELEMENT AND A SHEET METAL PART AND ALSO METHODS FOR THE MANUFACTURE AND ATTACHMENT OF A SELF-PIERCING PRESS-IN NUT

(75) Inventor: Jiri Babej, Lich (DE)

(73) Assignee: Profil-Verbindungstechnik GmbH & Co. KG, Friedrichsdorf (DE)

( * ) Notice: Subject to any disclaimer, the term of this patent is extended or adjusted under 35 U.S.C. 154(b) by 572 days.

(21) Appl. No.: 12/886,567

(22) Filed: Sep. 21, 2010

(65) Prior Publication Data

US 2011/0067478 A1 Mar. 24, 2011

(30) Foreign Application Priority Data

Sep. 21, 2009 (DE) .......................... 10 2009 042 336

(51) Int. Cl.
*F16B 37/04* (2006.01)

(52) U.S. Cl.
USPC ............................ 411/179; 411/180; 411/187

(58) Field of Classification Search
USPC ........................... 411/179–181, 187, 188, 501
See application file for complete search history.

(56) References Cited

U.S. PATENT DOCUMENTS

| | | | | |
|---|---|---|---|---|
| 3,399,705 A | * | 9/1968 | Breed et al. | 411/180 |
| 3,405,752 A | * | 10/1968 | Neuschotz | 411/180 |
| 4,543,023 A | * | 9/1985 | Capuano | 411/180 |
| 5,251,370 A | | 10/1993 | Muller | |
| 5,609,351 A | * | 3/1997 | Vermillion | 280/611 |

(Continued)

FOREIGN PATENT DOCUMENTS

| DE | 695 32 542 T2 | 11/1995 |
|---|---|---|
| DE | 10 2004 043 688 A1 | 4/2006 |

(Continued)

OTHER PUBLICATIONS

German Search Report in corresponding German Patent Application No. 10 2009 042 336.2 dated Oct. 6, 2010.

(Continued)

*Primary Examiner* — Flemming Saether
(74) *Attorney, Agent, or Firm* — Hershkovitz & Associates, PLLC; Abraham Hershkovitz; Eugene C. Rzucidlo (57) ABSTRACT

A self-piercing hollow press-in element, in particular a nut element for attachment to a sheet metal part, wherein the press-in element has a flange part of a larger diameter and a shaft part of a smaller diameter. The shaft part extends away from the flange part and has a circular piercing edge at its end face remote from the flange part. The side of the flange part facing the shaft part forms a sheet metal contact surface in ring shape and features providing security against rotation are provided at the shaft part which extend approximately from the level of the sheet metal contact surface over a part of the length of the shaft part along the latter. A ring-like recess is provided radially within the ring-shaped sheet metal contact surface in the flange part and excess material for the shaft part which arises during manufacture of the ribs providing security against rotation is located within the ring recess. Further designs of the press-in element and also of a component assembly and methods for the manufacture of the press-in element and of the component assembly are described.

16 Claims, 7 Drawing Sheets

(56) References Cited

U.S. PATENT DOCUMENTS

| | | | |
|---|---|---|---|
| 5,613,815 A * | 3/1997 | Muller | 411/181 |
| 6,125,524 A * | 10/2000 | Mueller | 29/520 |
| 6,712,370 B2 * | 3/2004 | Kawada et al. | 280/124.155 |
| 7,878,746 B2 * | 2/2011 | Babej | 411/179 |
| 8,096,743 B2 * | 1/2012 | Babej | 411/179 |
| 8,221,040 B2 * | 7/2012 | Babej et al. | 411/183 |
| 2007/0224017 A1 | 9/2007 | Pamer | |

FOREIGN PATENT DOCUMENTS

| | | |
|---|---|---|
| DE | 10 2004 062 391 A1 | 7/2006 |
| DE | 10 2007 034 987 A1 | 1/2009 |
| DE | 10 2008 052 383 A1 | 4/2010 |
| EP | 755 749 | 1/1997 |
| EP | 2019214 B1 | 7/2008 |
| EP | 1 690 913 | 7/2010 |
| GB | 1 474 766 | 5/1977 |

OTHER PUBLICATIONS

English language translation of German Search Report in corresponding German Patent Application No. 10 2009 042 336.2 dated Oct. 6, 2010.

* cited by examiner

PRESS-IN ELEMENT, COMPONENT ASSEMBLY CONSISTING OF A PRESS-IN ELEMENT AND A SHEET METAL PART AND ALSO METHODS FOR THE MANUFACTURE AND ATTACHMENT OF A SELF-PIERCING PRESS-IN NUT

CROSS-REFERENCE TO RELATED APPLICATIONS

This application claims priority of German Patent Application No. 10 2009 042 336.2, filed Sep. 21, 2009, the disclosure of which is expressly incorporated by reference herein in its entirety.

FIELD OF THE INVENTION

The present invention relates to a self-piercing hollow press-in element, to a component assembly consisting of a press-in element and a sheet metal part and also to a method of manufacturing a self-piercing press-in nut and also to a method for the attachment of a self-piercing press-in nut.

BACKGROUND OF THE INVENTION

In the manufacture of motorcar bodies and parts it is absolutely usual to operate with fastener elements which are present in the form of rivet elements, piercing elements or press-in elements.

With a rivet element the element is inserted into a pre-pierced sheet metal part and riveted to the sheet metal part by beading over the rivet section of the fastener element. The fastener element itself has a fastener part, i.e. either an internal thread or a bolt shaft with an external thread, whereby a further component can be secured to the sheet metal part using a bolt or a nut respectively. Piercing elements, which can be formed either as rivet elements or press-in elements are termed self-piercing elements i.e. the element itself cuts a hole in the sheet metal part and is subsequently secured to the sheet metal part. With the known press-in elements the sheet metal part can be pre-pierced or the press-in element can, as indicated above, be made in self-piercing manner, i.e. so that an attachment to a sheet metal part itself cuts a hole in the sheet metal part under the forces that are applied. The element is passed through the hole and the sheet metal part is pressed so that sheet metal material flows into undercuts of the press-in element. The press-in element is thus locked to the sheet metal part in this way so that it is securely fastened to the sheet metal part and cannot be straightforwardly pressed axially out of the sheet metal part or rotated relative to the sheet metal part with the usual torques which arise on attaching a bolt or a nut. Press-in elements are, in contrast to rivet elements, not deformed on attachment to the sheet metal part or essentially not intentionally deformed.

Such fastener elements have generally replaced the weld elements in the construction of motor vehicles which were previously welded to sheet metal bodywork and the like. The welding on of elements can, on the one hand, only be poorly integrated into the process of manufacture of individual sheet metal parts by mechanical deformation and leads also to an undesired contamination of the sheet metal part. Furthermore weld elements cannot be used with diverse sheet metal parts such as, for example, sheet metal parts which are pre-painted or which consist of two sheet metal layers, optionally with a plastic membrane disposed between them. They can also not be used when the sheet metal part is a high strength sheet metal part since the heat which arises during the welding leads to an unacceptable reduction of the characteristics of the sheet metal in the region of the weld position. In the manufacture of sheet metal parts for motor vehicles large numbers are required and the sheet metal thicknesses which enter into question normally lie in the range from 0.6 mm to 2.5 mm, occasionally beyond this up to 3 mm or somewhat more.

DE 10 2007 034 987 A1 describes a press-in element which can be formed as self-piercing element and which is suitable for attachment in thick sheet metal parts. The press-in element shown there has a head part having a ring surface confronting the sheet metal part and a neck part which projects away from the ring surface i.e. away from the sheet metal contact surface, with the head part furthermore having a ring shaped projection surrounding the neck part with a radial spacing and projecting away from the ring surface. The neck part also has a radially outwardly projecting ring bead which can be formed as a continuous ring bead and also as a locally interrupted ring bead. The tip of the bead has an axial spacing from the ring surface which is larger than the axial spacing of the tip of the ring-shaped projection from the ring surface. The ring bead lies radially within this projection and forms with the latter a pocket which takes up material of the sheet metal part. A press-in element of this kind certainly has its justification but is however relatively complicated in its manufacture. Furthermore, the design in the region of the ring surface and directly below the ring surface at the neck part can under some circumstances lead to greater difficulties during the attachment of the sheet metal part as the desired form-fitted locking which aimed at with the sheet metal part cannot be ensured under some circumstances to the desired level.

At this point reference should be made also the European patent EP-B-1 690 913. Here a further functional element is described which has a sheet metal contact surface of ring shape at the underside of a head part and a neck part projecting away from the latter which is here designed as a piercing section. This functional element is characterized in that it can be used with sheet metal parts of various thicknesses. For this purpose a ring-like bead is provided at the piercing section between the ring-like sheet metal contact surface and the free end of the piercing section and furthermore a ring recess is provided between the bead and the free end of the piercing section around the piercing section. In addition, ribs providing security against rotation are provided which extend in raised manner within a further ring groove between the sheet metal contact surface and the bead in the axial direction up to the bead. An element of this kind is entirely able to satisfy its task is however relatively complicated and is also not well suited to be used in a self-piercing manner in really thick sheet metal parts in the range from 4 mm thickness and above.

In EP-B-1 690 013 it is brought out that the element can be used with sheet metal thickness in the range between 0.6 mm and 4 mm, with sheet metal thickness above 3 mm being relatively rare in motorcar construction. Fastener elements are however also used in the manufacture of trucks but to a much smaller degree. Essentially it is only the use of rivet elements from the manufacture of motorcars which is known. These are also used in thinner sheet metal parts in trucks, for example in the area of the driver's cabin. More stable sheet metal parts of a truck, i.e. with sheet metal thicknesses greater than 3 mm and usually greater than 4 mm and even larger are—if at all—only provided in the rarest cases with rivet elements because the available rivet elements are simply not designed for such thick sheet metal parts. Furthermore, many fewer trucks are manufactured in comparison to motorcars. In the manufacture of trucks, weld elements are currently been used to a large extent.

SUMMARY OF THE INVENTION

The object of the present invention is to propose a self-piercing press-in element and a component assembly consisting of a press-in element and a sheet metal part as well as a method for the manufacture of such a press-in nut and such a component assembly which can be manufactured at favorable price or carried out even with small numbers of parts and can be rationally used. In order to satisfy this object a self-piercing press-in element is provided in accordance with the first aspect of the present invention, in particular a nut element for attachment to a sheet metal part, wherein the press-in element has a flange part of a larger diameter and a shaft part of a smaller diameter, with the shaft part extending away from the flange part and having a circular piercing edge at its end face remote from the flange part, wherein the side of the flange part facing the shaft part forms a sheet metal contact surface in ring shape and features providing security against rotation are provided at the shaft part which extend approximately from the level of the sheet metal contact surface over a part of the length of the shaft part along the latter.

Through this design a sharper transition can be provided between the ring-like sheet metal contact surface and the shaft part, whereby the element can be introduced in self-piercing manner into the sheet metal part and it is ensured that the flange part closely contacts the sheet metal part and that no disturbing radii or features are provided in the transition region which could hinder a firm seat of the ring-like contact surface at the sheet metal part. In this way the element can be firmly pressed into engagement with the sheet metal part without a spacing resulting between the sheet metal contact surface and the side of the sheet metal part facing it.

In this way settlement effects can be avoided reliably in operation whereby the bolt screwed into the hollow press-in element always retains the preset tension and the bolted connection does not become prematurely loose or fail, for example due to settlement effects. In the claimed design one press-in element can be used with various sheet metal thicknesses.

In accordance with a preferred embodiment features providing security against rotation are provided which are formed by noses or ribs providing security against rotation and which extend in the axial direction of the shaft part along the latter.

It is particularly favorable with a design of this kind when the said ribs or noses arise during manufacture of the features providing security against rotation such that a tool having corresponding grooves is placed over the shaft part of the press-in element and material is displaced from the region between the ribs and the noses partly into the ribs and noses and partly axially shifted up to and into the ring-like recess in the flange part where, so to say, the excess material can be hidden and indeed without preventing a sharp transition from the ring-like sheet metal contact surface into the outer side of the shaft part.

In accordance with a further aspect of the invention there is provided a self-piercing hollow press-in element, in particular a nut element for attachment to a sheet metal part, wherein the press-in element has a flange part of larger diameter and a shaft part of smaller diameter, with the shaft part extending away from the flange part and having a circular piercing edge at its end remote from a flange part, with the side of the flange part facing the shaft part forming a sheet metal contact surface of ring shape with the special characterizing feature that the diameter D2 amounts to approximately 50 mm for an M6 nut element, to approximately 16 mm for an M8 nut element, to approximately 17 mm for an M10 nut element, to approximately 18 mm for an M12 nut element and to approximately 19.5 mm for an M14 nut element.

The above quoted diameters of the shaft part straightforwardly suffice to produce a piercing slug in sheet metal parts having a thickness of 8 mm providing that the sheet metal parts have a moderate strength in the range of 280 to 320 MPa.

In accordance with a further aspect of the invention a self-piercing press-in element is provided, in particular a nut element for attachment to a sheet metal part, with the press-in element having a flange part of larger diameter and a shaft part of smaller diameter, and with the shaft part extending away from the flange and having a circular piercing edge at its end remote from the flange part, and with the side of the flange part adjacent to the shaft part forming a sheet metal contact shoulder, with the special characterizing feature that the press-in element does not have any features of shape formed as an undercut which are designed to receive sheet metal material to achieve an axial press-out resistance.

A design of the press-in element of this kind must first of all be regarded as surprising because one has to ask the question as to how the axial resistance against press-out load is achieved relative to the sheet metal part if no undercuts are provided. The answer to this lies in the fact that a special component assembly is provided, i.e. consisting of a fastener element and the sheet metal part, with the fastener element having a flange part of larger diameter and a shaft part of smaller diameter which extends away from the flange part and has a circular piercing edge at its free end remote from the flange part with the diameter of the piercing edge corresponding to or being fractionally larger than the diameter of the shaft part and with the side of the flange part facing the shaft part forming a sheet metal contact surface of ring shape with the special characterizing feature that the fastener element is designed for use with sheet metal parts having thicknesses in the region of 3 mm and larger and that the shaft part is located within a pierced hole in the sheet metal part which contacts the shaft part closely in a first region adjacent to the sheet metal contact surface and also in a second region adjacent to the piercing edge and in that in a third region between the first region and the second region the hole wall of the sheet metal part has a spacing from the shaft part.

This embodiment relates to the concept that the sheet metal part is first conically pierced in the sense that the hole diverges conically away from the piercing side of the element and after the full insertion of the press-in element into the conical pierced hole the sheet metal material is crushed at the side of the sheet metal part opposite to the flange part of the element around the pierced hole so that it moves radially inwardly and closely contacts the piercing section of the press-in element in the named second region. Because a close contact is in any event present in the first region of the piercing section the press-in element is retained well aligned in the sheet metal part and the fact that a gap is present in the third region does not have any disadvantageous effect on the stability of the installation of the press-in element at the sheet metal part. Through the close contact of the sheet metal part in the named second region the material of the sheet metal part engages into the unevenness of the surface of the piercing section in any event present there and causes an extremely pronounced stranglehold of this region, whereby the required security against rotation and security against press-out is established. The fact that the piercing section must itself be made relatively thick in its radial dimension in order to achieve the required piercing action in the sheet metal part and thus offers a large resistance against the radially inwardly moving sheet metal material also favors this stranglehold. A construction of this kind is also not obvious because the person averagely skilled in the art has to expect that with a conical piercing of the sheet metal part the element would be absolutely inadequately held in the sheet metal part and indeed especially when no undercut features are present. For thick sheet metal parts it is in any event difficult to adequately fill such undercuts with sheet metal material.

If necessary the required security against rotation and security against press-out can also be achieved in that an adhesive is present between the sheet metal parts and the hollow press-in element and indeed especially between the sheet metal part and the sheet metal contact surface and/or between the sheet metal part and the first region of the shaft part and/or between the sheet metal part and the second region of the shaft part and/or between the sheet metal part and the third region of the shaft part. The adhesive is preferably an adhesive which cures under pressure. Such pressure arises in all of the above-named regions during the press-in of the press-in element. They also arise in the third region of the shaft part because the originally large space provided here is reduced to the creation of the stranglehold in the second region of the shaft part whereby the pressure prevailing there arises.

Even if an adequate security against press-out can be achieved even without features providing security against rotation, features providing security against rotation can be provided at the shaft part and extend from approximately the level of the sheet metal contact surface over a part of the length of the shaft part along the latter. In a component assembly the sheet metal part is contacted in form-fitted manner, in the named first region by the features providing security against rotation there.

The component assembly which arises on the attachment of the press-in element is further characterized in that the sheet metal part has at its side remote from the sheet metal contact shoulder a ring-shaped recess around the piercing edge. To this extent the sheet metal part lies, at least in the region of the attachment of the fastener element, in one plane prior to and after the attachment of the fastener element, apart from the ring recess. This favors the bolted up situation when a further component is secured to the sheet metal part.

The features providing security against rotation are preferably formed by noses or ribs which extend in the axial direction of the shaft part along the shaft part. Recesses, which correspond to the noses or ribs providing security against rotation are then present in the sheet metal part. The press-in element is preferably a fastener element having a hollow shaft part with a central thread which extends through the flange part and the shaft part. Through the pronounced radial thickness of the shaft part it need not be feared that the shaft part will be compressed during the attachment to the sheet metal part so that the fastener element does not become excessively tall when providing an adequate length of the thread and thus is not excessively heavy.

A method for the manufacture of a self-piercing press-in nut having a flange part of larger diameter and a shaft part of smaller diameter extending away from the flange part, wherein the shaft part has a circular piercing edge at its end remote from the flange part is characterized in that one takes a blank having a cross-sectional shape corresponding to that of the flange part and the shaft part, with the shaft part having a smaller diameter in the region of the free end in the blank than in the region adjacent to the flange part, in that an axial recess is formed in the flange part adjacent to the shaft part and in that material in the region of the shaft part having the larger diameter is scraped away at a plurality of positions spaced apart around the periphery by means of a scraper with the scraped away material being introduced into the axial recess of the flange part and with noses or ribs remaining in the region between the scraped away regions which form features of the element providing security against rotation.

The method in accordance with the invention for the attachment of a self-piercing element in accordance with the invention to a sheet metal part is characterized in that a sheet metal part is supported on a die button which has a cylindrical opening having a diameter larger than the diameter of the shaft part in the region of the circular piercing edge; in that the shaft part of the press-in element is pressed by pressure on the flange part of the self-piercing press-in element through the sheet metal part to form a pierced opening of the sheet metal part, with the pierced opening diverging approximately conically in the press-in direction in relation to the longitudinal axis of the pierced opening and, after formation of the corresponding piercing slug, the sheet metal material in the region around the piercing edge is pressed to form a ring-like recess in the sheet metal part by means of a ring nose of the die button whereby the sheet metal material is deformed radially inwardly and contacts the shaft part of the press-in element in the region of its free end.

BRIEF DESCRIPTION OF THE FIGURES

Preferred embodiments of the invention are described in more detail in the patent claims and in the subsequent description with reference to the accompanying Figures. In the drawings there are shown:

DETAILED DESCRIPTION OF THE INVENTION

Figure 1A:
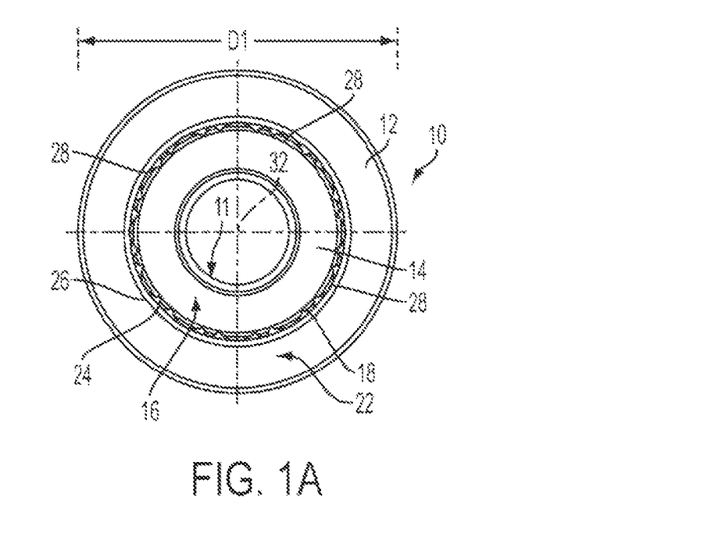
FIG. 1A an end view onto the piercing section of a press-in element in accordance with the invention in the form of a press-in nut, FIG. 1B a side view of the press-in nut in accordance with the invention of the FIG. 1A, partly in an axial section, FIG. 1C a perspective representation of a press-in nut in accordance with the invention and in accordance with FIG. 1A, FIG. 1D a representation similar to that of FIG. 1B but of a blank for the manufacture of the element in accordance with FIGS. 1A to 1C, FIG. 1E an enlarged representation of the region of FIG. 1D shown in a circle, FIG. 2A a schematic representation of the attachment of the press-in nut of the invention in accordance to FIGS. 1A to 1C to a thicker sheet metal part in a starting stage prior to the piercing of the sheet metal part, FIG. 2B a representation similar to FIG. 2A but after the piercing of the sheet metal part but prior to the final attachment of the press-in nut in the sheet metal part, FIG. 2C a representation of the finished component assembly, i.e. after complete attachment of the press-in nut in accordance with the invention to the sheet metal part, FIG. 2D an enlarged representation of the region of FIG. 2C shown in a circle, FIG. 2E a perspective representation on the top side of the sheet metal part in accordance with FIG. 2C, FIG. 2F a perspective representation of the bottom side of the sheet metal part in accordance with FIG. 2C, and FIG. 3A-3E representations corresponding to the FIGS. 2A, 2C, 2D, 2E and 2F for the attachment of the same press-in nut to a thinner sheet metal part.
Figure 1B:
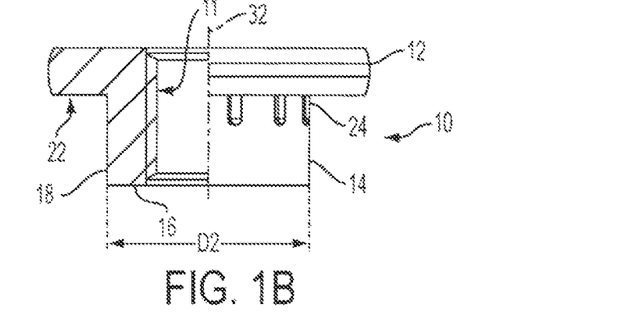
Figure 1C:
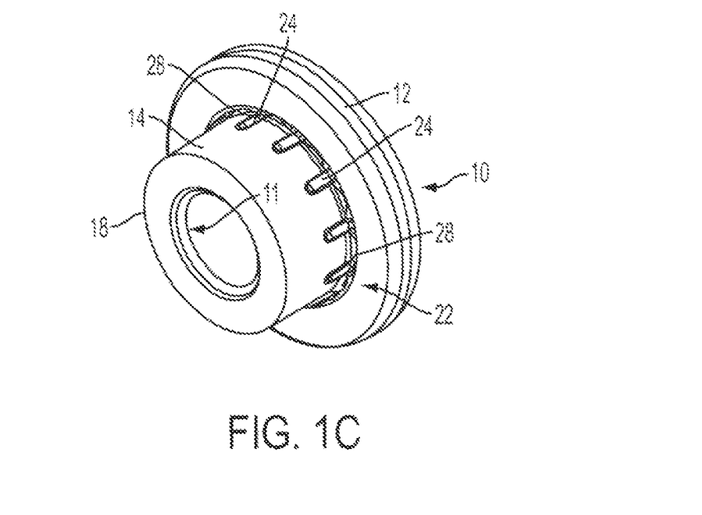

The FIGS. 1A to 1C show a self-piercing hollow press-in element 10 in the form of a nut element in attachment to a sheet metal part. The press-in element 10 has a flange part 12 of a larger diameter D1 and a shaft part 14 of smaller diameter D2, with the shaft part 14 extending away from the flange part 12 and having a circular piercing edge 18 at its end 16 remote from the flange part 12. The side of the flange part 12 adjacent the shaft part 14 forms a sheet metal contact surface 22 of ring-shape and features 24 providing security against rotation are provided at the shaft part. These features extend from approximately the level of the sheet metal contact surface 22 over a part of the length of the shaft part 14, for example over about 40% of the length of the shaft part 14 along the latter.

A ring-shaped recess 26 is provided in the flange part 12 radially within the sheet metal contact surface 22 of ring shape. The ring recess 26 can also be recognized in the blank in accordance with FIGS. 1D and 1E. The ring recess 26 receives excess material 28 of the shaft part 14 which arises during the manufacture of the ribs providing security against rotation, i.e. the excess material 28 is located within the ring-like recess 26.

Figure 1D:
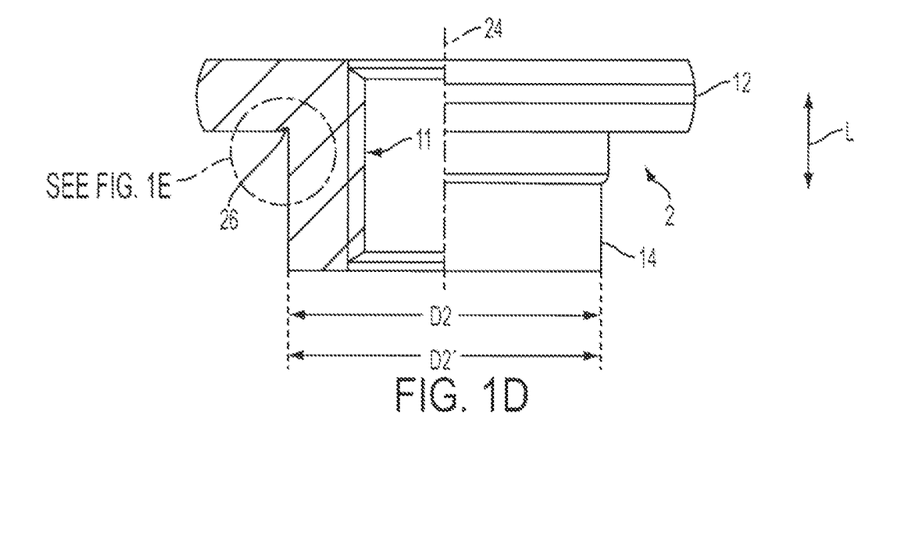
Figure 1E:
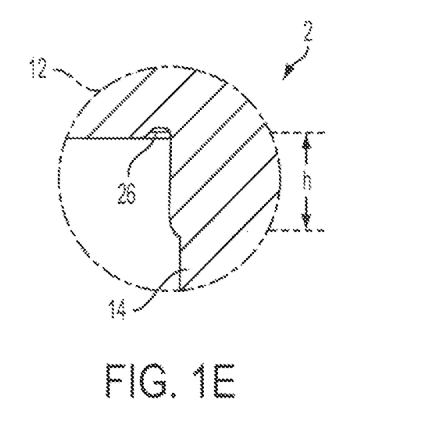

The method for the manufacture of the self-piercing press-in nut in accordance with FIGS. 1A to 1C is carried out in such a way that one first takes a blank 2 in accordance with FIG. 1D or FIG. 1E having a cross-sectional shape corresponding to that the flange part 12 and the shaft part 14 or manufactures it by cold heading. The blank 2 is so designed that the shaft part 14 has a diameter D2 in the region of the free end but a larger diameter D2' in a region adjacent to the flange part which extends over the length L of the desired features 24 providing security against rotation. Then (or previously) the axial recess 26 is formed in the flange part 12 adjacent to the shaft part 14 and material is subsequently axially scraped away from the region of the shaft part with the larger diameter D2' at a plurality of peripherally spaced apart positions, with the scraped away material 28 being brought partly into the axial recess 26 of the flange part 12. In the regions between the scraped away regions the noses or ribs remain which form features 24 providing security against rotation of the element. The diameter D2' of the region of the shaft part with a somewhat larger diameter (larger than D2) must not be so large as D2 plus twice the radial height of ribs 24 providing security against rotation but can rather be made somewhat smaller (but larger than D2) with the ribs providing security against rotation then partly being formed from the material displaced between the ribs and thus achieving the full radial height.

As is evident the features 24 providing security against rotation which are formed by the noses or ribs extend in the axial direction 32 of the shaft part 14 along the latter.

The self-piercing hollow nut element is so designed that, for an M6 nut element the diameter D2 is approximately 15 mm, for an M8 nut element the diameter D2 is approximately 16 mm, for an M10 nut element the diameter D2 is approximately 17 mm, for an M12 nut element the diameter D2 is approximately 18 mm and for an M14 nut element the diameter D2 is approximately 19.5 mm.

These values for the diameter D2 apply particularly for use with a sheet metal part of steel of moderate strength of 280 to 320 MPa and a thickness of about 8 mm. For higher sheet metal strengths, the diameters given must be made correspondingly larger. The same applies for sheet metal thicknesses greater than 8 mm.

One can also consider the self-piercing nut element 10 in accordance with the invention for attachment with the sheet metal part in such a way that there are no features of shape formed as an undercut which are designed to accommodate sheet metal material in order to achieve an axial press-out resistance. Instead of this the transition from the sheet metal contact surface 22 of ring shape into the piercing section 14 can be regarded as a sharp right angle if one ignores the ring recess 26 and the material 28 hidden therein which in any event are not disturbing because they are set back relative to the sheet metal contact surface 22 of the shape.

Figure 2A:
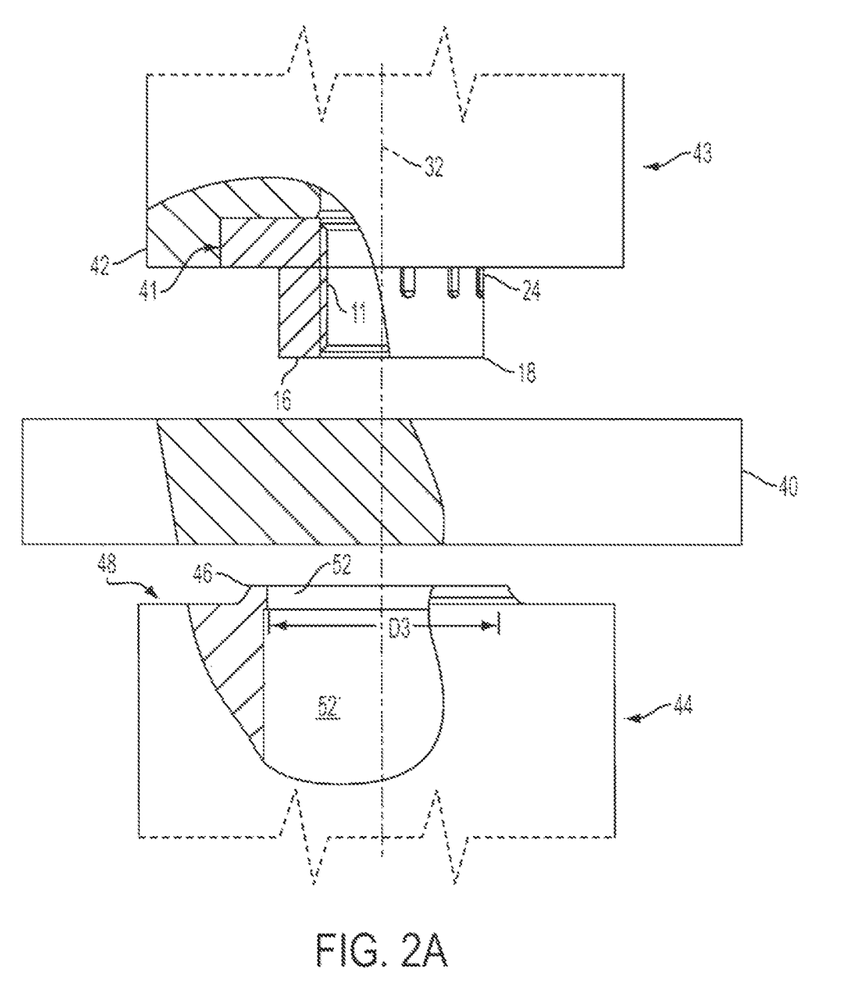

The method for the attachment of the self-piercing press-in nut in accordance with the FIGS. 1A to 1C to the sheet metal part 40 will now be described in more detail with reference to FIGS. 2A to 2E. FIG. 2A shows the starting situation in which the press-in nut 10 is held with its flange part in the mount 41 of a plunger 42 of a piercing head 43 which for example is attached to the upper tool of a press (not shown). Beneath the sheet metal part 40 there is located a die button 44 which, for example, can be supported at the lower tool of a press or at an intermediate plate of the press. If the die button 44 is attached to the lower tool of the press and if an intermediate plate is present, then the piercing head can be attached to the intermediate plate instead of to the upper tool of the press.

It should also be pointed out that it would also be possible to attach the die button to the intermediate plate of the press and the plunger in the upper tool of the press or to attach the plunger to the lower tool of the press and to mount the die button above the plunger at the upper tool of the press or at the intermediate plate of the press. The plunger could also be attached to the intermediate plate of the press and the die button to the upper tool of the press. Furthermore the possibility exists of mounting the die button and the plunger in a so-called C-frame and effecting the piercing of the sheet metal part by corresponding hydraulic loading of the one or other part, i.e. of the die button or of the plunger. The plunger can be formed as a part of a setting and/or piercing head in accordance with EP-B-755 749.

Figure 2B:
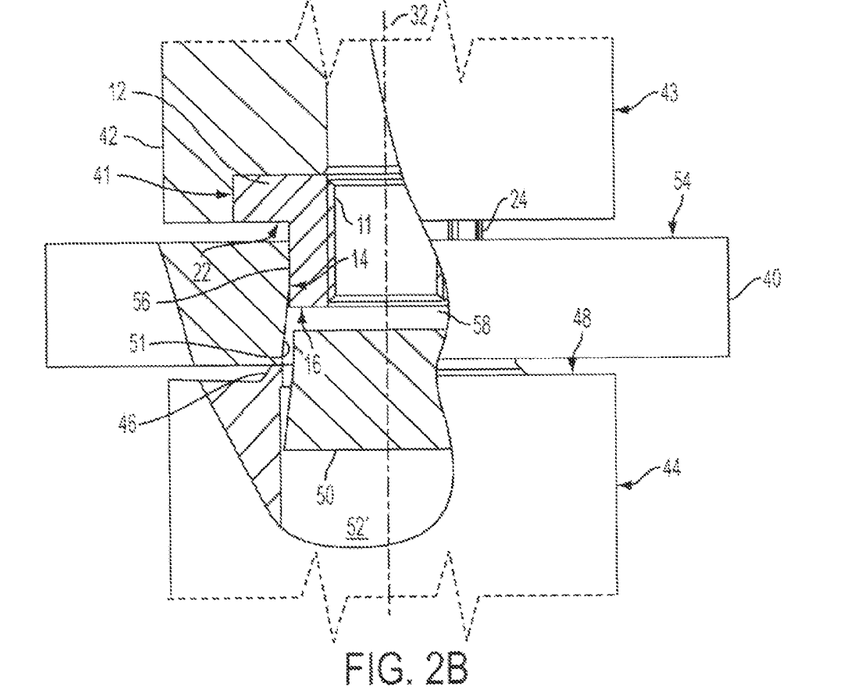

As can also be seen from FIG. 2B the sheet metal part 10 is clamped in the press between the die button 44 in the lower tool of the press and the plunger of the piercing head in the upper tool of the press or in the intermediate plate of the press, initially between the free end face 16 of the shaft part 14 of the press-in nut 10 and the ring nose 46 of the upper side 48 of the die button. Not shown in FIGS. 2A and 2B, but entirely customary, is be the provision of a hold-down member, for example of a right-cylindrical hold-down member which is arranged around the plunger 42 and is pressed by spring-pressure against the sheet metal part 40 and holds the sheet metal part against the ring nose 46 of the die button 44.

The die button 44 has a bore 52 having a diameter which is somewhat larger than the diameter D2 of the piercing section 14. On closing of the press the piercing section is pushed through the sheet metal part 40 and a piercing slug 50 arises which is pressed through the bore 52, 52' of the die button and disposed off. Since the diameter D3 of the bore 52 of the die button in the region of the end face 48 of the die button 44 is significantly larger than the diameter D2 a conical opening or hole 58 arises in the sheet metal part which diverges in the axial direction 32 starting from the punching in side. The conicity which corresponds for example to an included cone angle arranged from 4 to 15°, preferably about 7° is determined by the ratio of the diameter D3 to D2 and the respective sheet metal thickness. The bore 52, 52' of the die button 44 is preferably designed as a stepped bore with a lower region 52' being of larger diameter in comparison to the upper region with reference numeral 52. In this way it is ensured that the piercing slug falls through the bore 52' and is thus easy to disposal.

Figure 2C:
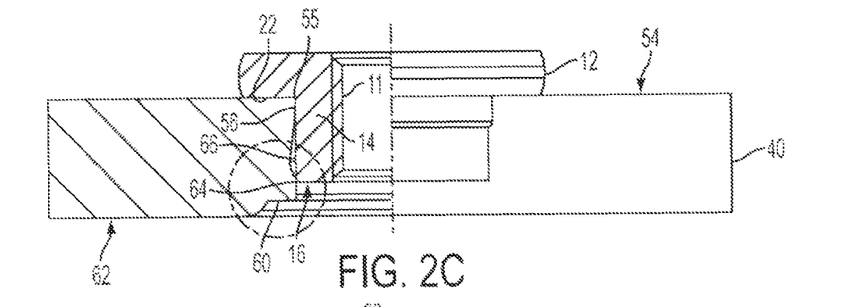
Figure 2D:
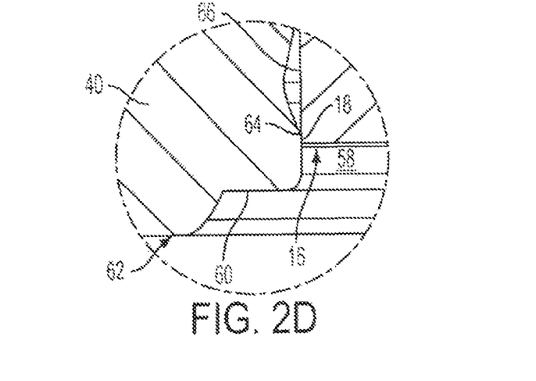
Figure 2E:
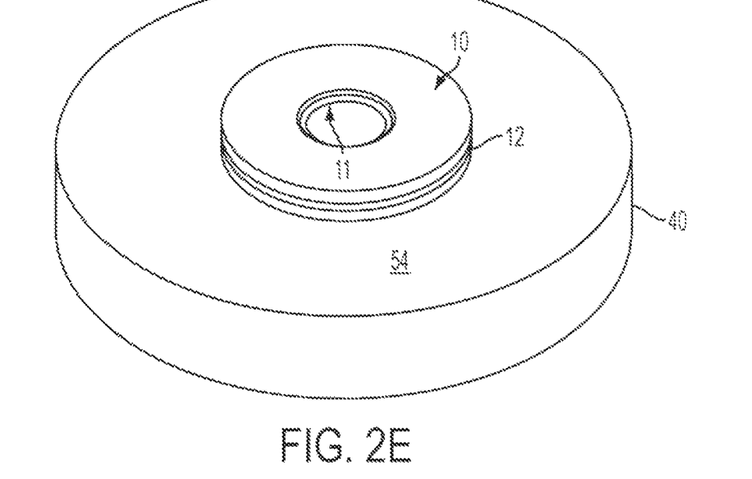
Figure 2F:
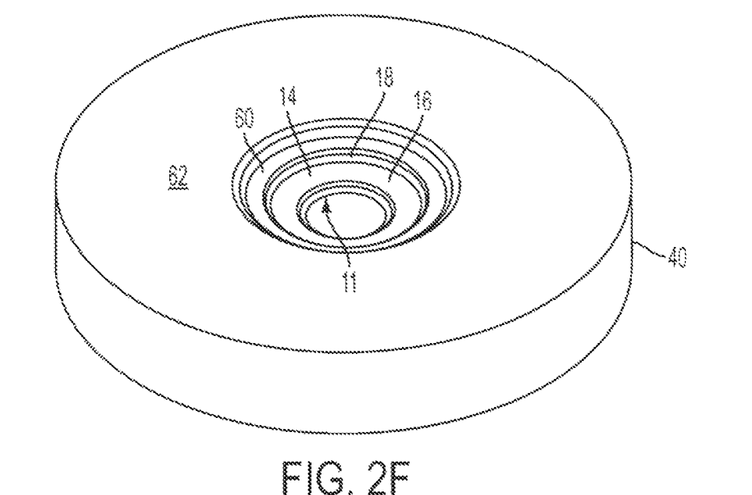
Figure 3A:
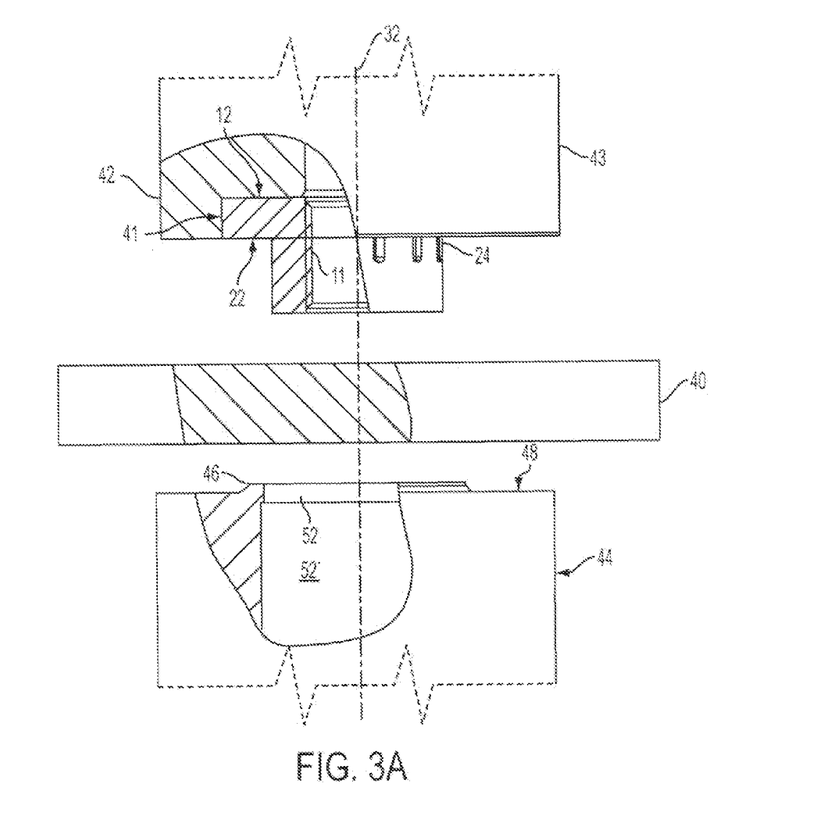
Figure 3B:
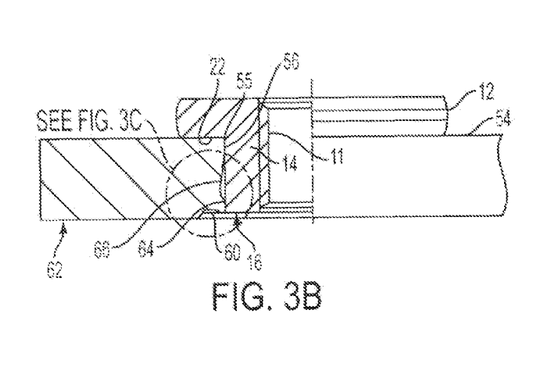
Figure 3C:
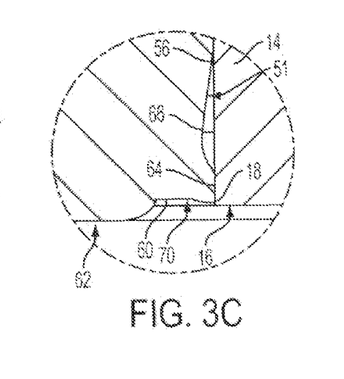
Figure 3D:
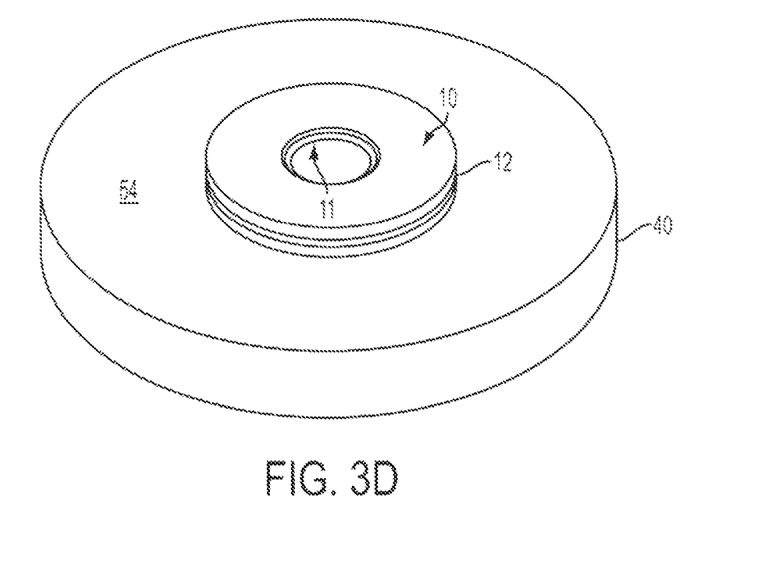
Figure 3E:
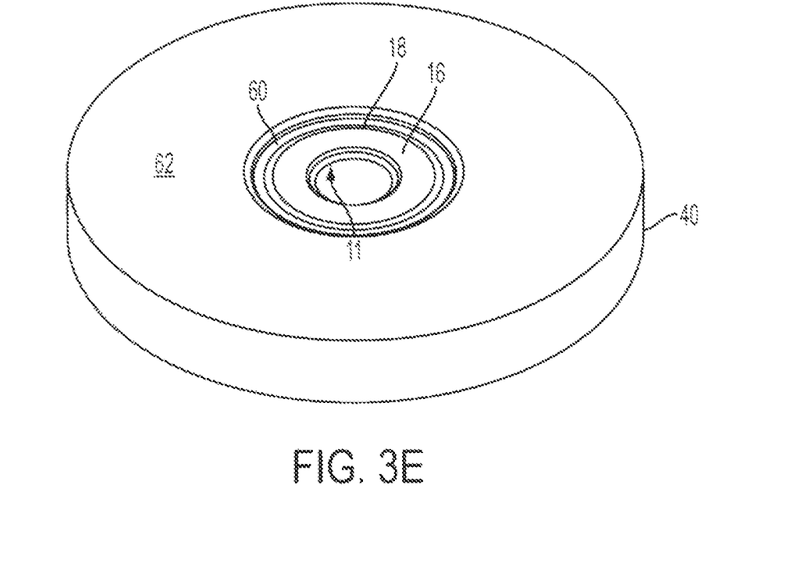

The shaft part 14 of the fastener element 10 is pressed through the upper cylindrical region 56 of the piercing hole 58 which simultaneously corresponds to an upper region of the shaft part, until the ring-like sheet metal contact surface or sheet metal contact shoulder 22 of the flange part 12 contacts the upper side 55 of the sheet metal part in FIG. 2C and the features providing security against rotation or the noses 24 providing security against rotation have been pressed into the upper cylindrical region 56 of the pierced hole 58 of the sheet metal part.

One notes from FIG. 2C that the sharp-edged transition 55 from the sheet metal contact surface 22 into the piercing section 14 ensures that the sheet metal contact surface 22 sits fully on the top side 54 of the sheet metal part whereby settling effects in operation need not be feared (provided that the ring-like sheet metal contact surface 22 is made adequately large).

On closing of the press the fastener element is so moved in a position above the sheet metal part 40 that the shaft part 14 of the fastener element moves through the hole 58 that arises until the ring nose 56 of the die button has formed a ring groove 60 in the lower side 62 of the sheet metal part 40 around the pierced hole 58. In this way the sheet metal material is forced to flow radially inwardly and it comes in a second region 64 adjacent to the free end of the piercing section to the above-mentioned intimate contact of the sheet metal material and to the stranglehold with the lower region of the piercing section 14. Between the first region 56 and the second region 64 in which the sheet metal material closely contacts the piercing section or the shaft part 14 there is a third region 66 where the hole wall of the sheet metal part has a spacing from the shaft part 14.

The press (or the possibly used C-frame) delivers the required force in order to press the noses 24 providing security against rotation through the side wall 58 of the hole, whereby grooves extending in the axial direction are formed in the cylindrical region 56 of the side wall of the pierced hole 58 by the noses 24 providing security against rotation and also delivers the force which is required in order to form the ring groove 60 and to reshape the sheet metal material in the second region 64.

One notes apart from this that the shaft part 14 is located in this thick sheet metal part within the pierced hole 58 in the sheet metal part, with the end face 16 or the end side of the free end of the piercing section 14 having a pronounced spacing from the lower side 62 of the sheet metal part. This spacing is also evident in FIG. 2E as is the fact that the hole wall of the sheet metal material in the region of the piercing edge 18 projects cylindrically beyond the piercing edge 18. The FIG. 2D also shows how the flange part 12 of the press-in nut lies fully against an upper side 54 of the sheet metal part 40.

The FIGS. 3A to 3D correspond largely to FIGS. 2A and 2C to 2E respectively but show that the same element 10 can also be used with a somewhat thinner thick sheet metal part. The series of drawings 3A to 3D has no drawing corresponding to that of FIG. 2B because FIG. 2B actually applies for two sheet metal thicknesses. The series of drawings 3A to 3D is however otherwise largely identical to the series of FIGS. 2A to 2E which is why the same reference numerals have been used for the individual components. The same description also applies for the figures of the series of FIGS. 3A to 3D and will therefore not be repeated. The only important differences lies in the fact that the spacing between the free end 16 of the piercing part 14 and the sheet metal underside is likewise smaller as a result of the smaller sheet metal thickness. This has the consequence that the base 70 of the ring groove 60 lies slightly above the piercing edge 18 of the shaft part 14. Here also the end 16 lies above the lower side 62 of the sheet metal part 40.

It should be briefly mentioned that an adhesive can be inserted between the sheet metal part and the hollow press-in element and indeed between the sheet metal part 40 and the sheet metal contact surface 22 and/or between the sheet metal part 40 and the first region of the shaft part 14 and/or between the sheet metal part 40 and the second region of the shaft part 14 and/or between the sheet metal part 40 and the third region of the shaft part 14. The adhesive can also be used additionally to or instead of the ribs 24 providing security against rotation and can also make a contribution to the security against press-out.

Furthermore it is evident in the drawings that the sheet metal part 40 lies in one plane at least in the region of the attachment of the fastener element prior to and after attachment of the fastener element apart from the said ring groove 60.

The press-in element is shown here as a finished nut element 10 with the internal thread 11, i.e. the fastener element 10 has a hollow shaft part with a central thread 11 which extends through the flange part 12 and the shaft part 14. The element could however also be formed without a thread and for example serve as a bearing sleeve. It could however also be provided with a smooth bore to accept a holding or cutting screw.

Furthermore it should be mentioned that the field of application of the press-in elements claimed here is not restricted to the manufacture of trucks but rather includes all areas where sheet metal parts of corresponding thickness are used which have to be provided with fastener elements.

In all embodiments all materials can be named as an example for the material of the fastener elements which, in the context of cold deformation achieve the strength values of class 8 in accordance to the ISO standard or higher, for example a 35B2 alloy in accordance with DIN 1654. The so formed fastener elements are also suitable for all commercially available steel materials for drawing quality sheet metal parts and also for aluminum or its alloys. Aluminum alloys including those of higher strength can also be used for the fastener elements, for example $AlMg_5$. Fastener elements of higher strength magnesium alloys such as for example AM50 can also be considered.

The invention claimed is:

1. A self-piercing hollow press-in element (10) having a central bore, an axial height and a thread cylinder within said central bore and extending over said axial height, the press-in element being for attachment to a sheet metal part (40), wherein the press-in element (10) further has a flange part (12) having a flange diameter (D1) and a shaft part having a length and a shaft diameter (D2) smaller than the flange diameter (D1), with the shaft part (14) extending away from the flange part (12) and having a circular piercing edge (18) at its end face (16) remote from the flange part, wherein a side of the flange part (12) facing the shaft part forms a sheet metal contact surface (22) in ring shape and there being ribs (24) providing security against rotation provided at the shaft part (14) which extend approximately from the level of the sheet metal contact surface (22) over a part of the length of the shaft part (14) along the latter wherein a ring recess (26) is provided radially within the ring-shaped sheet metal contact surface (22) in the flange part (12), and wherein material projections (28) of the shaft part (14) which arises during manufacture of the ribs (24) are located within the ring recess (26).

2. A self-piercing hollow press-in element in accordance with claim 1 and wherein the features (24) providing security against rotation are formed by noses or ribs which extend in the axial direction (32) of the shaft part (14) along the latter.

3. A self-piercing hollow press-in element (10) in accordance with claim 1, wherein the element is an M6 nut element and the shaft diameter lies at approximately 15 mm.

4. A self-piercing hollow press-in element (10) in accordance with claim 1, wherein the element is an M8 nut element and the shaft diameter lies at approximately 16 mm.

5. A self-piercing hollow press-in element (10) in accordance with claim 1, wherein the element is an M10 nut element and the shaft diameter lies at approximately 17 mm.

6. A self-piercing hollow press-in element (10) in accordance with claim 1, wherein the element is an M12 nut element and the shaft diameter lies at approximately 18 mm.

7. A self-piercing hollow press-in element (10) in accordance with claim 1, wherein the element is an M14 nut element and the shaft diameter lies at approximately 19.5 mm.

8. A self-piercing hollow press-in element (10) in accordance with claim 1, wherein it is designed for use with a sheet metal part (40) of steel of average strength with 8 mm thickness.

9. A component assembly consisting of a sheet metal part (40) and a self-piercing hollow press-in element (10) attached to the sheet metal part (40), the press-in element having a central bore, an axial height and a thread cylinder within said central bore and extending over said axial height, wherein the press-in element (10) has a flange part (12) having a flange diameter (D1) and a shaft part having a length and a shaft diameter (D2) smaller than the flange diameter (D1), with the shaft part (14) extending away from the flange part (12) and having a circular piercing edge (18) at its end face (16) remote from the flange part, wherein a side of the flange part (12) facing the shaft part forms a sheet metal contact surface (22) in ring shape and features (24) providing security against rotation are provided at the shaft part (14) which extend approximately from the level of the sheet metal contact surface (22) over a part of the length of the shaft part (14) along the latter wherein a ring recess (26) is provided radially within the ring-shaped sheet metal contact surface (22) in the flange part (12), there being ribs (24) providing security against rotation provided along said shaft part and wherein material projections (28) of the shaft part (14) which arises during manufacture of the ribs (24) are located within the ring recess (26), wherein the shaft part (14) which extends away from the flange part (12) with the circular piercing edge (18) at its free end (16) remote from the flange part (12) has a diameter of the piercing edge (18) being equal to that of the shaft part or being made fractionally larger than this, and the sheet metal part (40) has a thicknesses of 3 mm or larger, wherein the shaft part (14) is located within a pierced hole (58) in the sheet metal part (40), the pierced hole having a wall, wherein the pierced hole (58) intimately contacts the shaft part (14) in a first region of the shaft parts adjacent to the sheet metal contact surface (22) and in a second region of the shaft part adjacent to the piercing edge (18) and wherein, in a third region of the shaft part between the first region and the second region the wall of the pierced hole in the sheet metal part (40) has a spacing from the shaft part (14).

10. Component assembly in accordance with claim 9, wherein an adhesive is located between the sheet metal part (40) and the hollow press-in element (10), between at least one of the sheet metal part (40) and the sheet metal contact surface (22), the sheet metal part and the first region of the shaft part and the sheet metal part and the second region of the shaft part and/or between the sheet metal part (40) and the third region of the shaft part.

11. A component assembly in accordance with claim 9 or claim 10, wherein features (24) providing security against rotation are provided at the shaft part (14) and extend from about the level of the sheet metal contact shoulder (22) over a part (L') of the length of the shaft part (14) along the latter and wherein in the first region (56) the sheet metal part (40) contacts the features (24) that are provided there providing security against rotation in form-fitted manner.

12. A compnent assembly in accordance with claim 9, wherein the sheet metal part (40) has, at its side remote from the sheet metal contact surface, a ring recess (60) around the piercing edge (18).

13. A component assembly in accordance with claim 9 wherein the sheet metal part (40) lies in one plane at least in the area of the attachment of the fastener element (10) prior to and after-attachment of the fastener element apart from the said recess (60).

14. A component assembly in accordance with claim 9, wherein the fastener element (10) is a nut element.

15. A component assembly in accordance with claim 11, wherein the features (24) providing security against rotation are formed by noses or ribs which extend in the axial direction (32) of the shaft part (14) along the latter and wherein recesses corresponding to the noses or ribs providing security against rotation are present in the sheet metal part (40).

16. A component assembly in accordance with claim 9, wherein the fastener element (10) has a hollow shaft part (14) with a central thread (11) which extends through the flange part (12) and the shaft part (14).

* * * * *